United States Patent [19]
Elrod et al.

[11] Patent Number: 5,253,546
[45] Date of Patent: Oct. 19, 1993

[54] VARIABLE VALVE ACTUATING APPARATUS

[75] Inventors: Alvon C. Elrod, Clemson, S.C.; Michael T. Nelson, Birmingham, England

[73] Assignee: Clemson University, Clemson, S.C.

[21] Appl. No.: 6,156

[22] Filed: Jan. 19, 1993

Related U.S. Application Data

[60] Continuation of Ser. No. 943,755, Sep. 10, 1992, abandoned, which is a division of Ser. No. 827,618, Jan. 29, 1992, Pat. No. 5,161,429, which is a division of Ser. No. 530,546, May 29, 1990, Pat. No. 5,136,887.

[51] Int. Cl.$^5$ .............................................. F16H 53/00
[52] U.S. Cl. .................................... 74/567; 29/888.1; 74/568 R; 74/569; 123/90.6
[58] Field of Search ...................... 74/567, 568 R, 569; 123/90.15, 90.17, 90.18, 90.60, 90.22, 90.23; 29/888.1

[56] References Cited

U.S. PATENT DOCUMENTS

| | | |
|---|---|---|
| 733,220 | 7/1903 | Krebs . |
| 862,448 | 8/1907 | Cornilleau . |
| 1,527,456 | 2/1925 | Woydt et al. . |
| 1,815,134 | 7/1931 | Weiner et al. . |
| 2,057,354 | 10/1936 | Withers et al. . |
| 2,888,837 | 6/1959 | Hellmann . |
| 3,516,394 | 6/1970 | Nichols . |
| 3,682,152 | 8/1972 | Muller-Berner . |
| 4,332,222 | 6/1982 | Papez . |
| 4,357,917 | 11/1982 | Aoyama . |
| 4,388,897 | 6/1983 | Rosa . |
| 4,539,946 | 9/1985 | Hedelin . |
| 4,587,934 | 5/1986 | Moores . |
| 4,644,912 | 2/1987 | Umeha et al. . |
| 4,708,029 | 11/1987 | Urano . |

(List continued on next page.)

FOREIGN PATENT DOCUMENTS

| | | |
|---|---|---|
| 0324500 | 7/1989 | European Pat. Off. .............. 74/567 |
| 704575 | 4/1941 | Fed. Rep. of Germany ..... 123/90.6 |
| 727987 | 11/1942 | Fed. Rep. of Germany . |

(List continued on next page.)

OTHER PUBLICATIONS

"Variable Valve Timing for IC Engines," Automotive Engineer, vol. 10, #4, Aug.-Sep., 1983.

*Primary Examiner*—Vinh T. Luong
*Attorney, Agent, or Firm*—Dority & Manning

[57] ABSTRACT

An actuating apparatus, which can be used to perform variable valve timing of the intake or exhaust valves of an internal combustion engine, includes a hollow shaft with at least one slot defined through a cylindrical wall. A movable cam member is disposed to project through the slot and is rotatable relative to the hollow shaft in a channel defined in the interior surface of the hollow shaft. A base circle band extends circumferentially around the outer surface of the hollow shaft between the endwalls of the slot. The exterior surface of the hollow shaft can define grooves which receive front or back ear members of the cam member. The exterior surface of the hollow shaft also can define recesses, which in some embodiments have bottom surfaces and in other embodiments have partial bottom surfaces or no bottom surface. The recesses can receive tongue members formed on the cam member. The cam member can be engaged by a cam follower that has a roller to engage the cam surface. When the length of the roller exceeds the width of the cam surface, base circle arcuate sections can be provided on the exterior surface of the hollow shaft to carry the roller across the exposed portion of the slot that exists between the endwall of the slot and the free end of the cam member. An inner shaft extends through an opening defined transversely through the cam member and nonrotatably engages same. The nose portion of the cam member can be defined by a rotatable roller. Twin cam members having identical cam surface profiles can be disposed side-by-side, with one cam member projecting through the slot and the other cam member secured to the outer surface of the hollow shaft. A single follower such as a tappet defining a circular cylindrical surface can be provided to engage both cam members and can be held nonrotatably.

10 Claims, 7 Drawing Sheets

U.S. PATENT DOCUMENTS

| | | |
|---|---|---|
| 4,770,060 | 9/1988 | Elrod et al. . |
| 4,771,742 | 9/1988 | Nelson et al. . |
| 4,856,469 | 8/1989 | Okazaki et al. . |
| 4,917,058 | 4/1990 | Nelson et al. . |
| 4,977,793 | 12/1990 | Husted . |
| 5,041,253 | 8/1991 | Husted . |
| 5,048,366 | 9/1991 | Spanio . |
| 5,157,832 | 10/1992 | Hughes ............................. 29/888.1 |

FOREIGN PATENT DOCUMENTS

| | | |
|---|---|---|
| 1924114 | 11/1970 | Fed. Rep. of Germany . |
| 2747884 | 5/1979 | Fed. Rep. of Germany . |
| 2921645A | 11/1980 | Fed. Rep. of Germany . |
| 3041864A | 5/1982 | Fed. Rep. of Germany . |
| 3212663A | 10/1983 | Fed. Rep. of Germany . |
| 3234640A | 3/1984 | Fed. Rep. of Germany . |
| 517937 | 5/1921 | France . |
| 1109790 | 2/1956 | France ................... 74/567 |

VARIABLE VALVE ACTUATING APPARATUS

This is a continuation of application Ser. No. 07/943,755, filed Sep. 10, 1992, which was abandoned upon the filing hereof and which is a divisional application of Ser. No. 07/827,618, filed Jan. 29, 1992, now U.S. Pat. No. 5,161,429, which is a division of 07/530,546, filed May 29, 1990, now U.S. Pat. No. 5,136,887.

BACKGROUND OF THE INVENTION

The present invention relates to variable cam apparatus primarily for implementing variable valve timing techniques in internal combustion engines, and more particularly to such apparatus employing rollers.

Mechanisms using a camshaft capable of varying the timing of valves, i.e., when the valves open and when the valves close, in relation to the movement of the crankshaft, and how long they remain open or closed, are known. In some devices, variable timing is obtained by controlling the cam follower geometry. U.S. Pat. No. 4,357,917 to Aoyama discloses a number of different geometries for the nose portion of a cam (FIGS. 9A, 9B, and 9C) used in a variable valve timing system for induction control of an internal combustion engine.

In a number of the variable valve timing mechanisms, a cam lobe is movable relative to the outer cylindrical surface of the camshaft. Such designs include U.S. Pat. No. 4,770,060 to Elrod et al. U.S. Pat. No. 4,771,742 to Nelson et al, and U.S. Pat. No. 4,917,058 to Nelson et al. which patents are hereby incorporated herein by reference. In many of these movable lobe camshafts, the cam follower is a flat surface disposed at the end of a valve tappet. Examples of this design shown in U.S. Pat. No. 2,888,837 to Hellmann, DE 3,234,640A to Kruger. DE 2,921,645 to Lehr, French Patent No. 1,109,790 to Rooy. Patentschrift 704,575 to Von Ruti, and U.S. Pat. No. 1,527,456 to Woydt et al. An alternative design uses followers with a curved surface. Examples of curved follower surfaces are shown in DE 3212-663-A to Martin (FIG. 1), U.S. Pat. No. 4,388,897 to Rosa (FIG. 7), and U.S. Pat. No. 4,770,060 to Elrod et al (FIG. 3). In some such curved follower designs, DE 3212-663-A to Martin for example, the base of the cam rides above the outer cylindrical surface of the camshaft and meets the circular surface tangentially and continuously so that a follower encounters little or no discontinuity upon leaving the cam surface and engaging the camshaft surface where the cam surface ends.

As known in the art, the reduction of friction in the valve train can result in more efficient engine output. The use of roller followers can reduce friction where the cam surface meets the follower surface. In a further alternative design, roller followers are used to engage the surface of a movable cam. Examples of the roller follower designs include a multi-linkage design shown in the top center FIG. 10 of an article entitled "Variable Valve Timing for IC Engines" appearing in Volume 10, No. 4, of *Automotive Engineer* (August–September 1983), and the more conventional designs shown in Patentschrift 727,987 to Borner. U.S. Pat. No. 862,448 to Cornilleau. and U.S. Pat. No. 733,220 to Krebs. In contrast to the designs employing flat or curved surfaces as cam followers, the devices employing roller followers encounter distinct problems relating to rising and falling movements of the roller followers over short durations. These roller follower movements translate through a suitable linkage to corresponding sudden, brief opening and closing movements of the valves. These valve movements interrupt the rate at which the valve is opening or closing, as the case may be. Such movements either briefly accelerate the trend (opening or closing) of valve movement or decelerate the trend of valve movement. One of these problems occurs when the roller moves between the camshaft's base circle, which is defined by the exterior surface of the camshaft, and either the beginning of the leading edge of the cam surface or the end of the trailing edge of the cam surface.

The problem relating to the base of the cam is illustrated well in U.S. Pat. No. 862,448 to Cornilleau, which uses a roller follower to engage a cam lobe which moves in a radial direction into and out of a slot in the camshaft. As shown in particular in Cornilleau FIGS. 13, 15 and 16, the roller encounters a gap between the riding surface of the cam and the riding surface on the exterior surface of the camshaft.

The problem is also apparent in Patentshrift No. 727,987 to Borner. A U-shaped main cam is fixed to rotate with the Borner shaft, and a secondary cam is connected to a solid shaft inside the hollow main shaft and projects through an opening in the main shaft corresponding to an opening in the U-shaped portion of the main cam. The secondary cam is movable into and out of this opening in the U-shaped portion of the cam. In this way, one can change the length of the cam surface which opens the valve and maintains the valve in the open position. This permits changing the duration of time during which the valve is held open for example. The roller is initially lifted on the full width of the main cam so that during the lifting of the valve, the entire inertia of the control mechanism as well as the tension of the valve springs and the gas pressure against the valve head can be spread over the full width, which thus is available to absorb the forces without an unduly high surface pressure. The linkage roller rolls first of all over the upper head of the main cam. Then the linkage roller moves over the precisely equally high head of the secondary cam. Finally, the linkage roller drops suddenly as it moves over the closing ramp and onto the lower cam surface whereby the valve closes. The failure of the surfaces to match, produces discontinuous roller motion when the linkage roller drops upon the closing ramp onto the lower cam surface. Thus, the otherwise smooth rising and falling motion of the rollers, which translates through a suitable linkage to activate valves for example, becomes subject to sudden discontinuous movements as the roller rides on the transition portions of the cam surface.

Instead of a U-shaped design, Borner's main cam can be designed in a split fashion whereby both halves of both sides can be pushed over the secondary cam. However, this split design does not alleviate the problem just described.

Devices shown in documents DE 3234640A1 to Kruger. DE 2921645A to Lehr, and DE 3212663A1 to Martin, which involve movable cams engaging flat surface followers or curved surface followers, are affected far less than roller followers when engaged by movable cams.

The Martin movable cam 3 has extended ears which overlap and ride on or above an inner sleeve that is integral with the camshaft and the nonmovable cam. The movable cam 3 is keyed to rotate with inner shaft element 2. The valve tappet 4 has a curved follower surface in the shape of a partial circle whose radius corresponds to the elevation of the cam from the axis of the shaft. The follower surface engages the movable cam at a single point, similar to the roller follower. However, when the transition from the movable cam to the base circle of the camshaft must be bridged, the curved surface of the follower engages the movable cam at one point and the base circle of the camshaft at another point. By contrast, the roller follower is incapable of engaging the movable cam at one point and the base circle at another point without riding up and down the valley formed between the base circle and the movable cam. However, as noted above, it becomes desirable if roller followers can be used. Moreover, in such environments, variable valve timing mechanisms employing a movable cam lobe also are desirable.

OBJECTS AND SUMMARY OF THE INVENTION

It is a principal object of the present invention to reduce the level of friction in a cyclical actuating apparatus employing one or more cams, without introducing discontinuous movements during the actuating motion of an individual actuation cycle.

Another principal object of the present invention is to provide a cyclical actuating apparatus for the valves of an internal combustion engine, wherein the apparatus has variable valve capability, provides relatively reduced levels of friction in the valve train, and accomplishes the foregoing without introducing discontinuous valve movements during an individual engine cycle.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the actuating apparatus of the present invention is designed so that it can be used as part of the mechanism which actuates the opening and closing of valves (both intake and exhaust) in internal combustion engines (both spark ignition and diesel).

In accordance with the present invention, an elongated hollow shaft is provided. The hollow shaft preferably defines a longitudinal axis, an exterior surface, an interior surface, and a slot defined through the interior and exterior surfaces. Portions of the interior surface define a circular cylindrical shaped bearing surface that can be used to rotatably support a solid inner shaft (described hereafter) as well as other members (also described hereafter). The slot is defined with a pair of opposed sidewalls and a pair of opposed endwalls disposed between the sidewalls. Preferably, the slot sidewalls are continuous, and the slot endwalls can be either continuous or discontinuous. A separate slot will be defined through the cylindrical wall of the hollow shaft so that one slot is available for each movable cam member (described hereafter) that is desired as part of the actuating apparatus of the present invention. Thus, typically, the hollow shaft will be provided with several slots arranged at different locations along the length of the hollow shaft.

In further accordance with the present invention, the exterior surface of the hollow shaft defines a base circle band, which is a portion of the exterior surface of the hollow shaft that extends between the endwalls of each slot. The base circle band extends in the longitudinal direction of the hollow shaft, beyond the portion defined between the sidewalls of the slot. The base circle band is defined by a constant radius of curvature and is intended to carry the cam follower when the follower leaves the surface of the cam.

In those embodiments of the present invention designed to be used with cam followers that are longer than the width of the cam surface, the hollow shaft further can define base circle arcuate sections. These base circle arcuate sections provide upper cam receding surfaces. These upper cam receiving surfaces have the same radius of curvature as the base circle band and are disposed so as to be able to carry the peripheral edges of the cam follower, especially a roller follower. The base circle arcuate sections preferably are disposed beside the sidewalls and near the vicinity of where the sidewalls meet the endwalls of the slot. The upper cam receiving surfaces of the base circle arcuate sections carry the roller follower over the gap that can be produced between the endwall of the slot and the free edge of the movable cam member (described hereafter) that is configured to meet the endwall of the slot. Each base circle arcuate section has a minimum length that is long enough to extend the full arcuate distance that the slot is exposed when the movable cam member is oriented for maximum exposure of the slot between the slot endwall and the surface of the movable cam member that is configured to abut with the slot endwall. Moreover, the two base circle arcuate sections disposed to one side of the slot can be formed integrally with one another and integrally with the periphery of the base circle band. In other words, the combination of the periphery of the base circle band and the two base circle arcuate sections on one side of the slot can extend around the full 360 of the hollow shaft and form a base circle ring with a continuous upper cam receiving surface that can carry the free end of the roller of a roller follower.

In still further accordance with the present invention, the hollow shaft is provided with a channel that is defined in the interior cylindrical bearing surface of the hollow shaft. The channel has channel sidewalls and a channel bearing surface. Instead of having channel endwalls, the channel begins and ends where the slot begins and ends. The channel bearing surface is disposed generally opposite to the slot defined through the hollow shaft. The channel bearing surface is configured to rotatably support the movable cam member to enable the movable cam member to rotate relative to the hollow shaft. Thus, the channel sidewalls are generally disposed parallel to the slot sidewalls. Preferably, the channel is formed on the opposite surface of the hollow shaft on which the base circle band is formed. In this construction, an additional thickness of material is afforded at the location of the hollow shaft where the channel is disposed and the movable cam member is to be supported by the channel bearing surface defined in the hollow shaft. Preferably, the joints where the channel bearing surface meets the channel sidewalls are filleted to avoid stress concentrations.

In still further accordance with the present invention, a movable cam member is provided and defines an actuating lobe and a seating member. Preferably, the actuating lobe and the seating member are integrally connected to each other and typically will be manufactured as the opposite ends of a unitary movable cam member.

The seating member has an outer circular cylindrical shaft bearing surface that can rotatably engage the channel bearing surface of the interior surface of the hollow shaft. The actuating lobe defines a cam surface that is configured to be able to project through the slot from inside the hollow shaft. When the actuating lobe projects through the slot, the outer cylindrical shaft bearing surface will be disposed to rotatably engage the channel bearing surface. The cam surface is configured to engage the cam follower in a manner that raises and lowers the follower according to a desired pattern of actuating the valve, which is connected to the follower by mechanical or other means. The cam surface defines a nose ramp (located at the nose portion of the cam member), a leading ramp, and a trailing ramp. The nose ramp is situated between the leading ramp and the trailing ramp and is disposed the greatest distance away from the outer cylindrical shaft bearing surface of the seating member. The leading ramp forms the portion of the cam surface that is engaged by the cam follower before the cam follower engages the nose ramp. Similarly, the trailing ramp forms that portion of the cam surface that engages the cam follower after the cam follower rides over the nose ramp during revolution of the hollow shaft.

In yet further accordance with the present invention, an elongated inner shaft is provided. The elongated inner shaft defines a longitudinal axis of rotation.

In still further accordance with the present invention, means are provided for nonrotatably connecting the inner shaft and the movable cam member for simultaneous rotational movement. In one embodiment of the nonrotatable connecting means, two mating sets of radially extending spline members are provided. One set is provided on the outer surface of the inner shaft, and a second set is provided on the internal circumference of an opening formed transversely through the movable cam member in the vicinity of the outer cylindrical shaft bearing surface. The spline members interlock with one another and prevent relative rotation between the inner shaft and the movable cam member. Another embodiment of the nonrotatable connecting means provides the inner shaft with a non-circular cross-section and a bushing surrounding the inner shaft with a non-circular opening that mates with the cross-section of the inner shaft. Still another embodiment of the nonrotatable connecting means employs a shrink-fitting technique. In yet a further embodiment of the nonrotatable connecting means, a raised key member is disposed to extend from the perimeter of the opening defined through the movable cam member. The key member extends in a direction opposite to the nose ramp and toward the center of the opening defined through the movable cam member. A key recess is then defined in the outer surface of the inner shaft along the length thereof to the point where the movable cam member is to be located circumferentially and longitudinally with respect to the outer surface of the inner shaft. The shrink-fit embodiment and the key embodiment permit a greater thickness of material forming the seating member, and this adds to the strength of the cam member and its ability to bear the stresses which are placed on the movable cam member during operation of the apparatus.

The movable cam member can define a front stop surface and a back stop surface. These surfaces form the portion of the movable cam member that butts against the endwalls of the slot. They can extend from the free end of the leading ramp and the trailing ramp, respectively.

In some embodiments of the present invention, the exterior surface of the hollow shaft can define a pair of grooves. One end of each groove can be connected to one of the two opposite ends of the slot and intersect with or replace the endwall of the slot, while the other end of each groove can be formed by a groove endwall. Each groove has a bottom surface that defines an exterior cylindrical ear bearing surface that is used to support a corresponding surface formed in the movable cam member associated with this particular embodiment of the hollow shaft. This associated embodiment of the movable cam member defines a front ear and a back ear. The exterior surface of the front ear extends from the end of the leading ramp that is disposed opposite from the nose ramp. At least a portion of the exterior surface of the front ear that is in the vicinity of the free end of the front ear is defined by the same radius of curvature that defines the base circle band of the hollow shaft. The front ear and the back ear each further define an inner cylindrical ear bearing surface that is disposed opposite the exterior surface of the front ear and back ear, respectively. The inner cylindrical ear bearing surface defines the same constant radius of curvature that defines the exterior cylindrical ear bearing surface of the grooves of the hollow shaft. The inner cylindrical ear bearing surface and the outer cylindrical shaft bearing surface define the boundary of ear cavities which can receive a portion of the hollow shaft slidably into and out of the cavity as the movable cam member rotates its outer cylindrical shaft bearing surface relative to the channel bearing surface of the interior surface of the hollow shaft. These embodiments of the movable cam member permit the hollow shaft to be formed of added material in the portion of the hollow shaft that is receivable inside the ear cavities. This added material strengthens the hollow shaft in the vicinity of the slot.

In yet other embodiments of the present invention, a cam follower is provided. In some of the embodiments including a cam follower, the cam follower can be of the roller type of cam follower. The roller type follower typically includes a base member and a roller that is rotatably mounted relative to the base member. The roller is formed as a circular cylindrical shape having a longitudinal rotational axis defining the length of the roller. The length of the roller can be greater than, equal to or less than the width of the cam surface of the movable cam member.

In those embodiments in which the length of the roller follower is smaller than or just equal to the width of the cam surface, the provision of base circle arcuate sections is inadequate to carry the roller across the gap formed between the endwall of the slot and the corresponding free edge of the movable cam member. Accordingly, in such embodiments, additional structures are provided on the movable cam member and the hollow shaft. For example, a ramp tongue can define an exterior roller carrying surface. At least in the vicinity of the free end of the ramp tongue, the exterior roller carrying surface desirably defines the same radius of curvature as the radius of curvature of the base circle band. The ramp tongue should be long enough n the direction of rotation of the hollow shaft so that the ramp tongue can extend between and across the maximum exposure of the adjacent slot when the movable cam member is oriented so as to produce this maximum exposure. The exterior roller carrying surface of each ramp tongue defines a width measured in the direction of the longitudinal axis of the hollow shaft. This width is narrower than the width of the cam surface of the movable cam member and narrower than the length of the cylindrical surface of each roller follower. In order to accommodate the ramp tongue, which extends from the end of either the leading ramp or the trailing ramp in some embodiments or from the front ear or back ear in other embodiments, a recess is defined through one end of the base circle band. In some embodiments, the recess is defined completely through the base circle band and the interior surface of the hollow shaft, much as the slot is formed. Alternatively, each recess can be provided with a bottom surface that is configured with a constant radius of curvature to form a section of a cylindrical surface, much as the cylindrical ear bearing surfaces which accommodate the ears of the associated movable cam member embodiments. The provision of the bottom surface in the recess adds rigid support to the ramp tongue and permits the thickness of the ramp tongue to be lessened while still being capable of bearing the cylindrical surface of the roller follower. Each recess communicates with one of the ends of one of the grooves or one of the endwalls of the slot, depending upon the particular embodiment.

In still further embodiments, the ramp tongue can be one or more saw-tooth shaped projections which meet with associated projections formed in the endwall of the slots. In such embodiments, the leading or trailing ramp can define a biased free edge, as does the endwall of the slot.

In further accordance with the present invention, the actuating lobe of the movable cam member can define a cylindrical cavity in the nose portion where the nose ramp would be formed. A roller member with a cylindrical surface then would be rotatably mounted in the cylindrical cavity so that the nose portion of the movable cam member would itself be formed as a rotatable roller. Accordingly, in such embodiments, the cam follower typically would be of the lever type or the tappet type.

In yet further accordance with the present invention, a second cam member could be mounted adjacent a movable cam member. The second cam member has a cam surface profile identical to that of the movable cam member and thus is essentially the twin of the movable cam member in this respect. The second cam member is disposed beside the sidewall of the slot through which the movable cam member projects and is secured to the hollow shaft so that the second cam member is not movable relative to the hollow shaft. Moreover, both the movable cam member and the twin second cam member could be provided with rollers rotatably mounted at their respective nose portions. This embodiment is particularly useful when used in connection with a push rod engine in which the tappet surface is part of a hydraulic valve lifter. In such embodiments, the tappet surface is formed with a circular cylindrical shaped surface. The tappet also is keyed so that the central longitudinal axis of rotation of the circular cylindrical surface remains fixed in a transverse direction relative to the direction of rotational movement of the twin cam members as the camshaft rotates. The keying of the tappet surface prevents it from rotating and getting out of alignment with the arcuate movement of the twin cam members as the camshaft rotates. Thus, the tappet surface will engage each roller in a circular arc.

The accompanying drawings, which are incorporated in and constitute a part of this specification, illustrate embodiments of the invention and, together with the description, serve to explain the principles of the invention.

Figure 1:
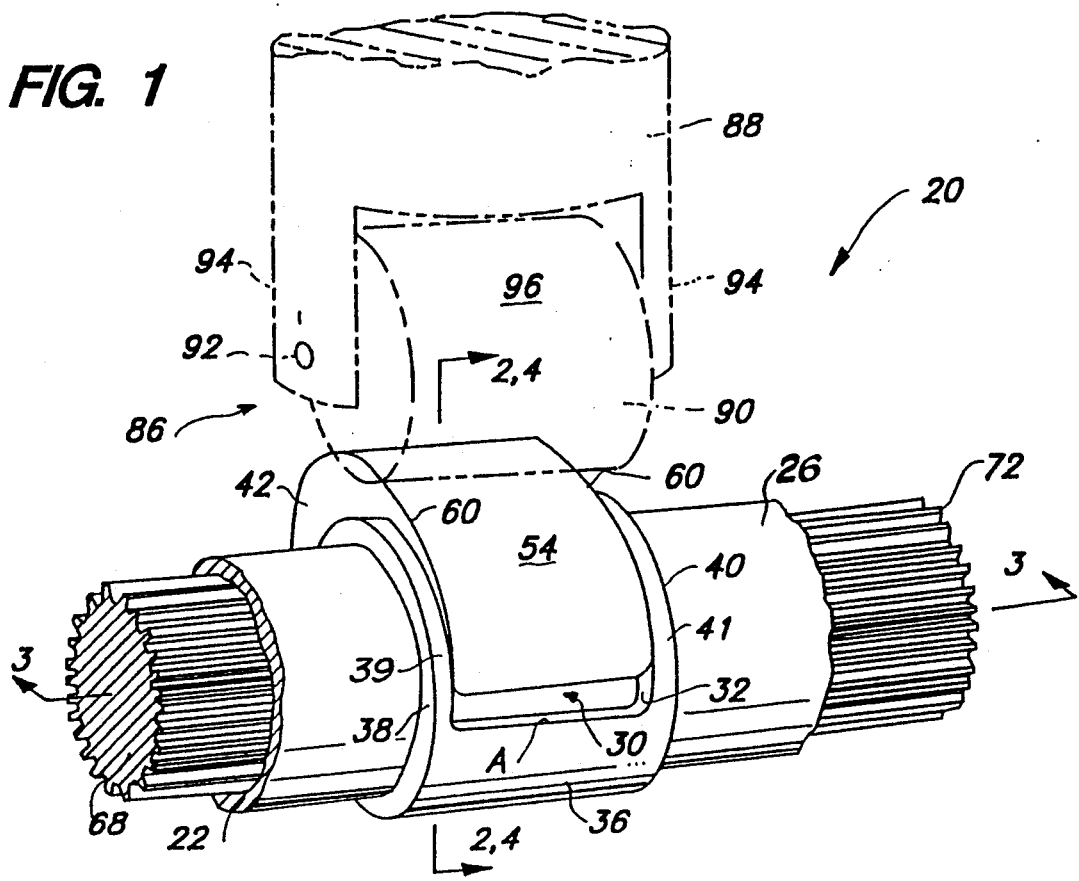
FIG. 1 is an elevated perspective view of components of a preferred embodiment of the present invention.
Figure 4:
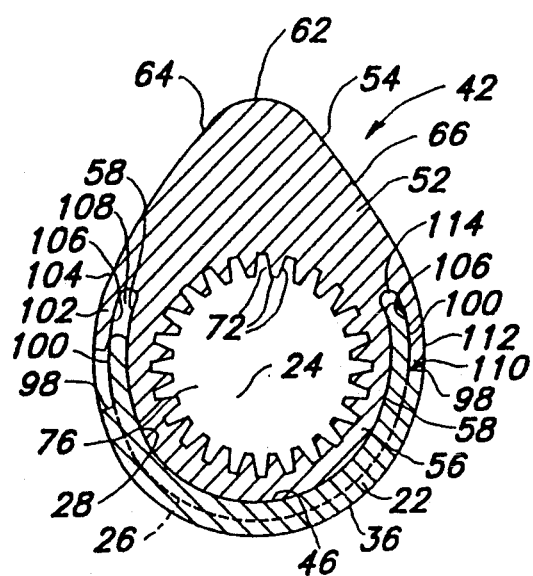
Figure 5:
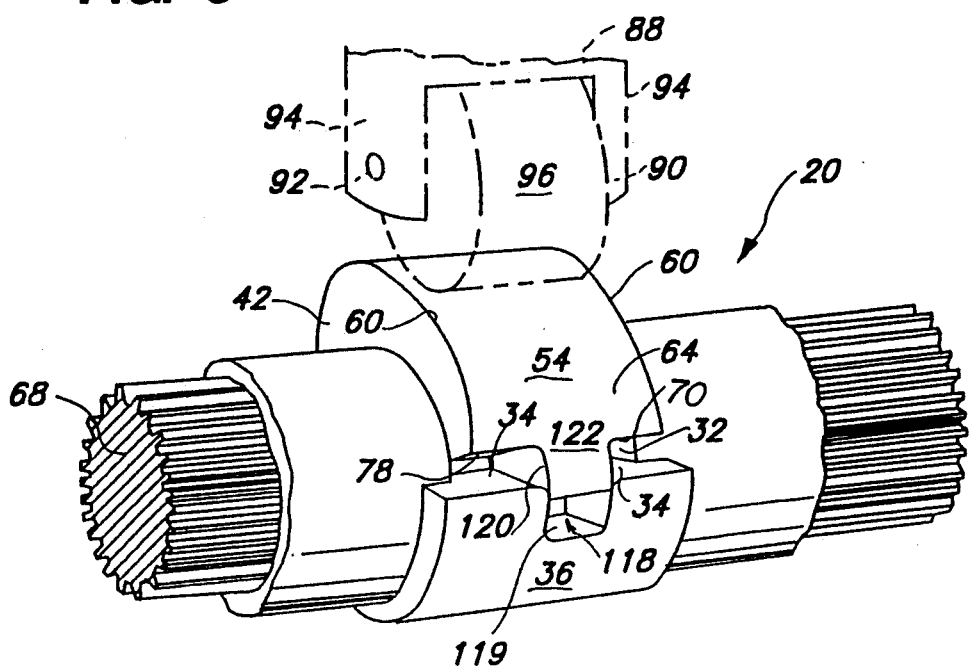
Figure 5A:
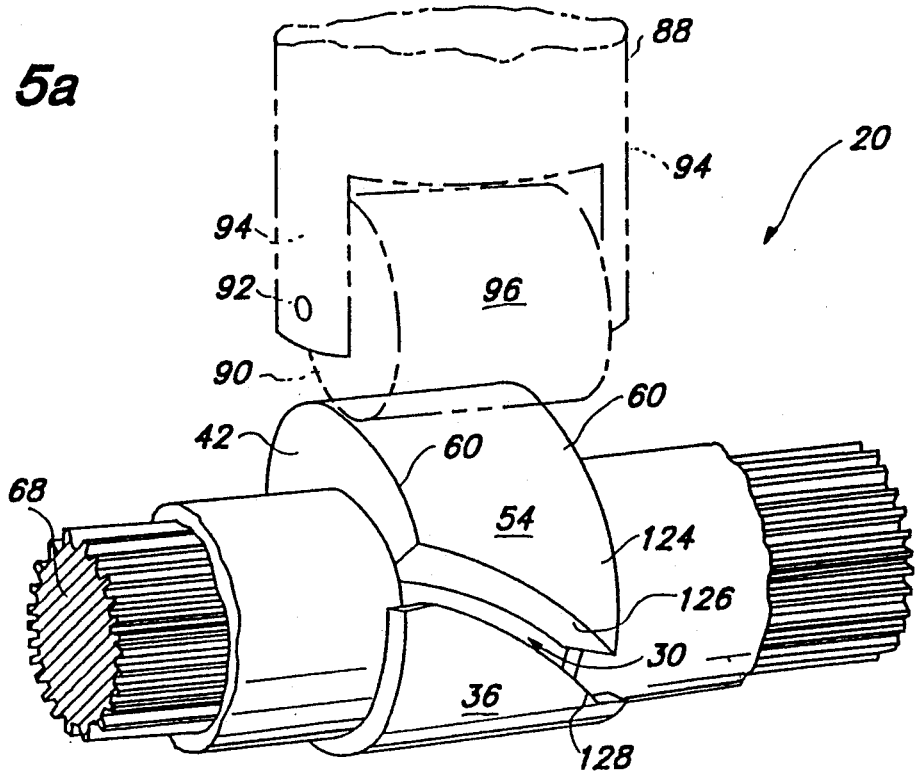
Figure 6:
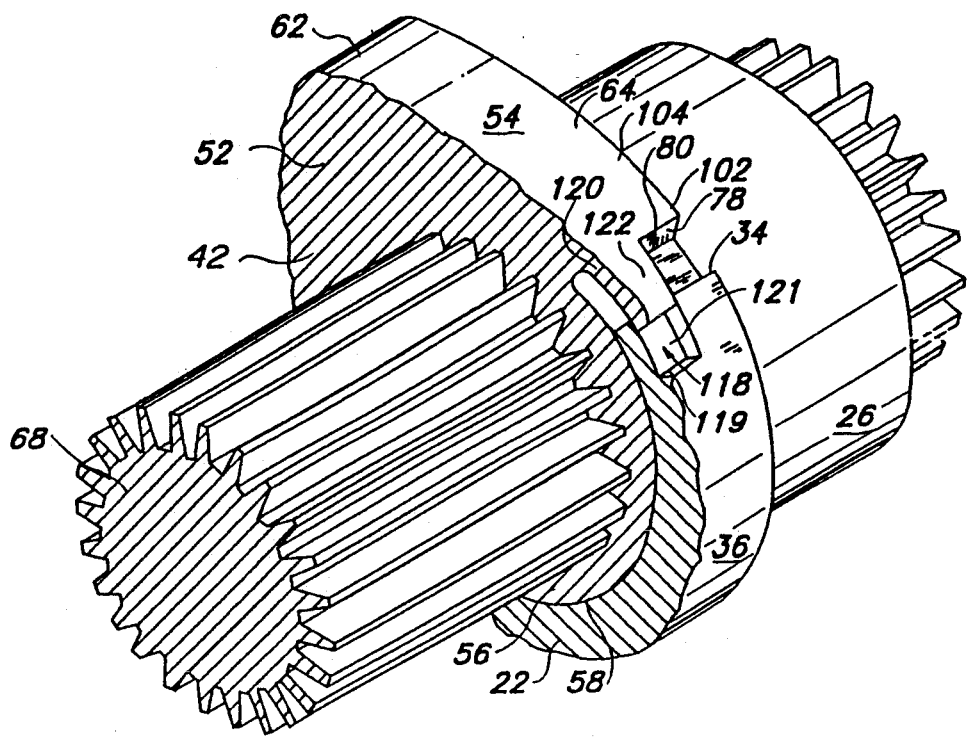
Figure 7:
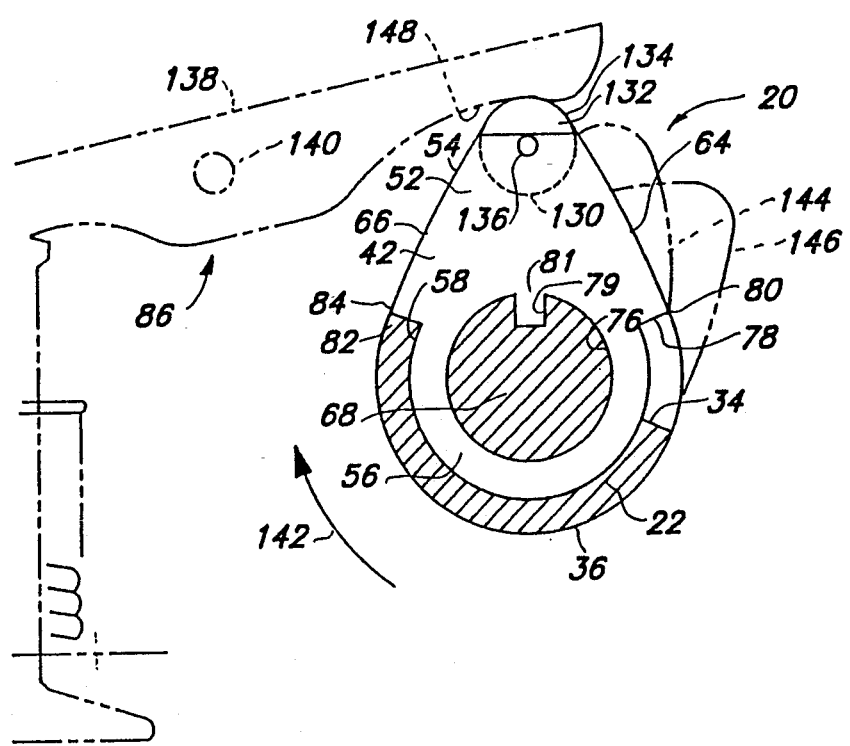
Figure 8:
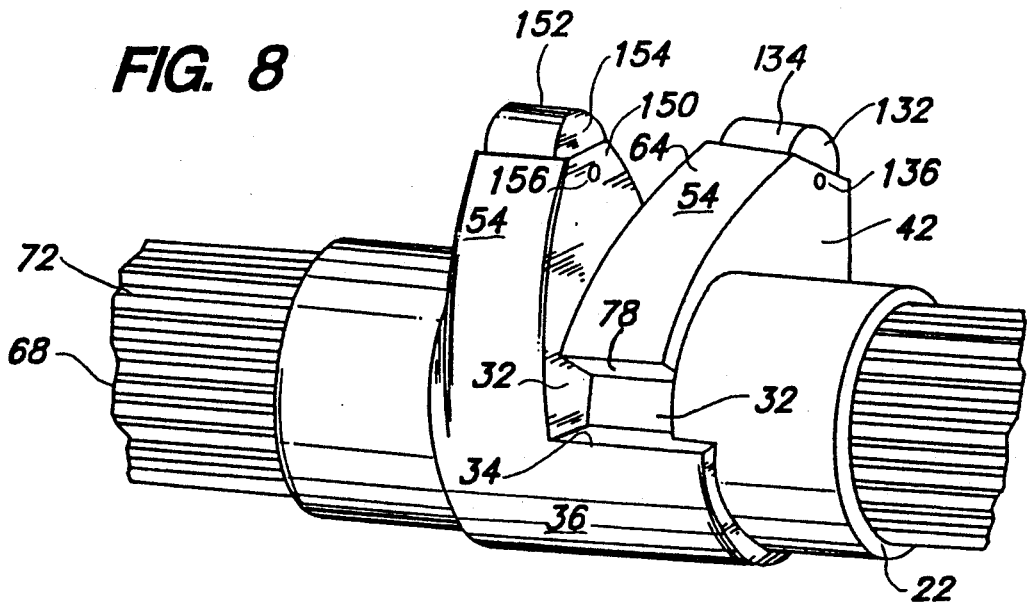
Figure 9:
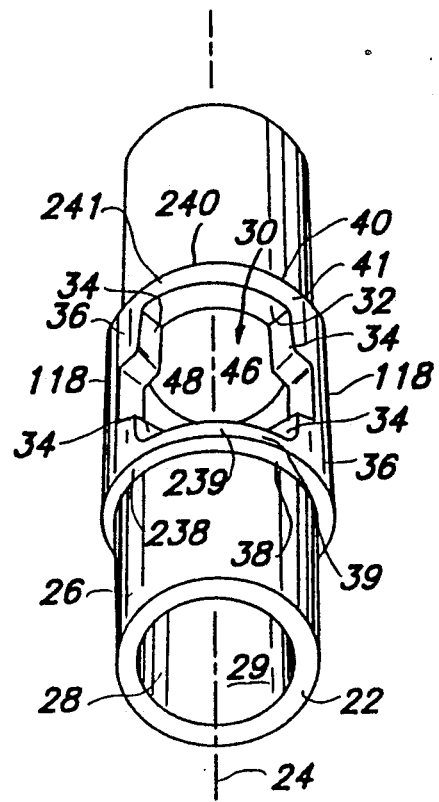
Figure 10:
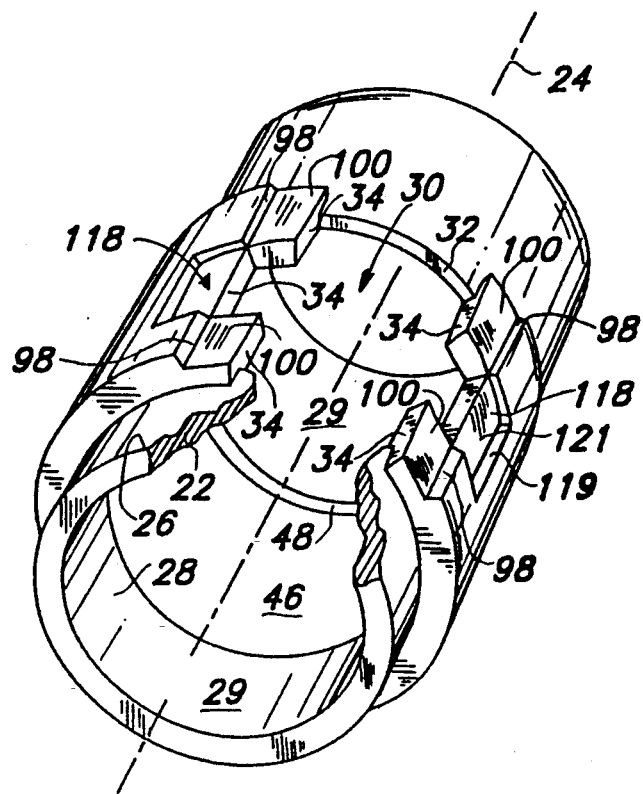
Figure 11:
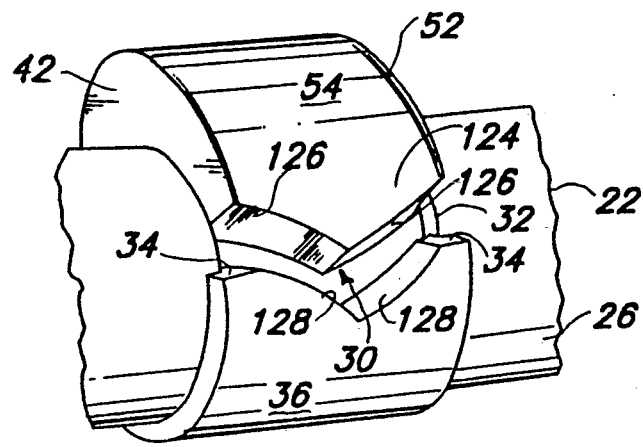
Figure 13:
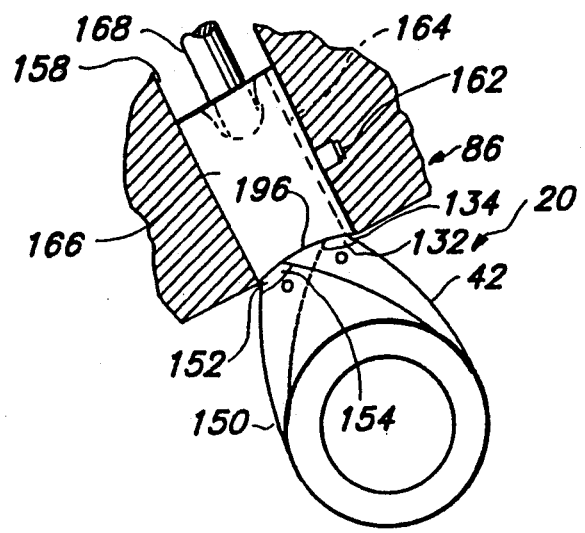
Figure 12:
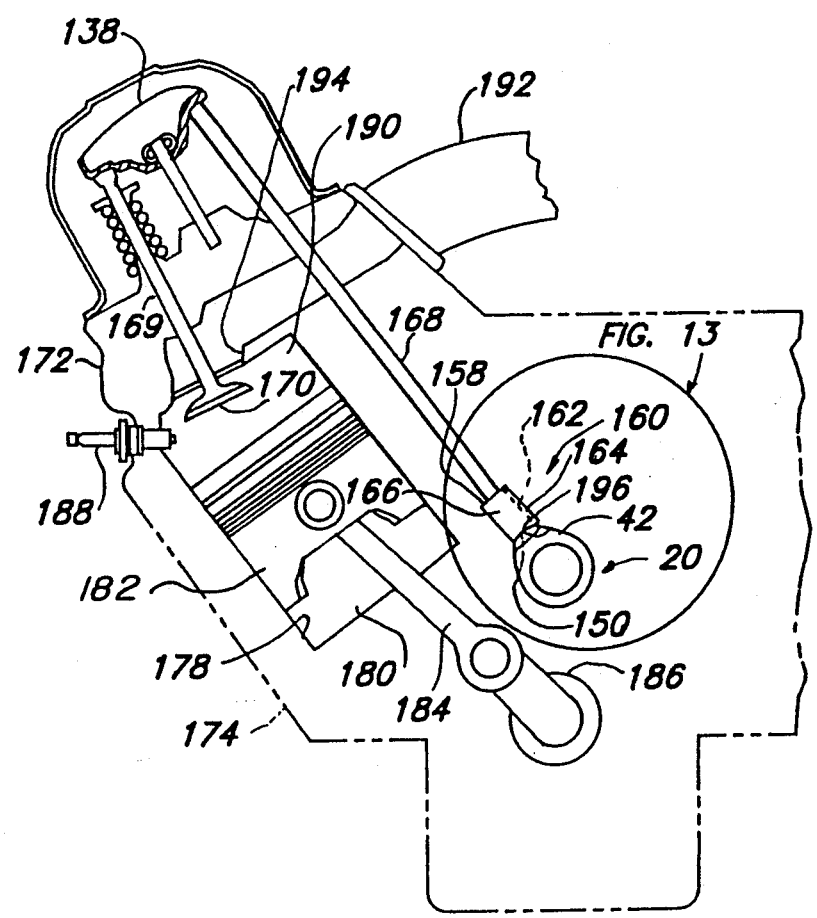

FIG. is a partial cross-sectional view of the embodiment of FIG. 1 taken along the line of sight looking toward 3—3 in FIG. 1;

FIG. 4 is a partial cross-sectional view of components of an embodiment of the present invention as taken along the line of sight looking toward 4—4 in FIG. 1;

FIG. 5 is an elevated perspective view of components of another preferred embodiment of the present invention;

FIG. 5a is yet another elevated perspective view of components of another preferred embodiment of the present invention;

FIG. 6 is an elevated perspective view in part and a cross-sectional view in part of components of another alternative preferred embodiment of the present invention;

FIG. 7 is a partial cross-sectional view of components of still another alternative preferred embodiment of the present invention with some components shown in phantom (dashed line);

FIG. 8 is an elevated perspective view of components of still another preferred embodiment of the present invention;

FIG. 9 is an elevated perspective view of components which can be used with several of the preferred embodiments of the present invention;

FIG. 10 is an elevated perspective view of alternative components which can be used with several further preferred embodiments of the present invention;

FIG. 11 is yet another elevated perspective view of components of another preferred embodiment of the present invention;

FIG. 12 illustrates a partial schematic view of an internal combustion engine embodiment according to the present invention; and FIG. 13 illustrates an expanded detail schematic view of a portion of the embodiment shown in FIG. 12.

DETAILED DESCRIPTION OF THE PREFERRED EMBODIMENTS

In some preferred embodiments of the present invention, a single movable cam lobe member is provided for actuating a roller cam follower. In some of these roller follower embodiments of the present invention, the length of the roller follower engaging the single cam lobe is longer than the width of the cam lobe. In other of these roller follower embodiments of the present invention, the length of the roller follower is less than or equal to the width of the single cam lobe. In yet other preferred embodiments of the present invention, the nose of a single cam lobe member is provided with a roller to actuate a lever cam follower or a tappet cam follower. In still further preferred embodiments of the present invention, both noses of a split cam lobe are provided with a roller to actuate a lever cam follower or a tappet cam follower. In yet further preferred embodiments, the cam follower forms part of a hydraulic lifter.

Reference now will be made in detail to the present preferred embodiments of the present invention, several examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover the modifications and variations of this invention provided they come within the scope of the appended claims and their equivalents.

Examples of components of preferred embodiments of the present invention are indicated generally by the designating numeral 20 in FIGS. 1, 2, 5, 5a, 7, 12 and 13. In accordance with some embodiments of the actuating apparatus of the present invention, a cam follower can be provided. The cam follower defines a surface which engages the actuating surface of a cam member (described in detail hereafter). For some embodiments of the present invention, the cam follower preferably is a roller type follower. However, in instances in which use of a roller type follower is impractical, a lever type follower or a tappet follower can be used. A lever type follower defines a cam engaging surface that pivots about an axis. A tappet type follower defines a cam engaging surface that moves longitudinally n a path toward and away from the actuating surface of the cam member. One or the other type of follower s usually desired, depending on the particular application. As embodied herein and shown in FIGS. 1 (in phantom), 2, 7 (in phantom) and 13 for example, a cam follower is generally designated by the designating numeral 86.

The roller type follower typically includes a base member and a roller that is rotatably mounted relative to the base member. As embodied and shown in FIGS. 1 and 2 for example, cam follower 86 is of the roller type and includes a base member 88 and a roller 90. Roller 90 is rotatably mounted via an axle 92 in the opening of a fork formed by opposed depending members 94 extending from base member 88. Roller 90 defines an elongated cylindrical surface 96 and is rotatable about a central longitudinal axis that is disposed coincident with axle 92. Base member 88, roller 90, axle 92, and cam surface 54 preferably are formed of a rigid material such as steel or other strong metal used for fabricating roller followers and cams for automotive applications.

As shown in FIG. 1 for example, the length of roller cylindrical surface 96 as measured in the direction of axle 92 can be longer than the width of the cam surface 54 of the movable cam member 42 (described hereafter). In such embodiments, roller cylindrical surface 96 extends beyond the opposite edges 60 of the cam surface 54 when the roller cylindrical surface 96 engages the cam surface 54. In an alternative embodiment such as shown n FIG. 5 for example, the length of roller cylindrical surface 96 can be less than the width of the surface 54 of the movable cam member 42. In a yet further embodiment of the present invention such as shown in FIG. 5a for example, the length of roller cylindrical surface 96 can be equal to the width of the surface 54 of the movable cam member 42.

In further accordance with the present invention, an elongated hollow shaft is provided. The hollow shaft defines a longitudinal axis, an exterior surface, an interior surface, and a slot defined through the interior and exterior surfaces. The hollow shaft can be formed in any of the conventional methods for making camshafts. For example, casting methods can be used to form the hollow shaft with slots. Alternatively, the shaft can be machined, and features such as the slot can be formed by electrodischarge machining of the slot. As embodied herein and shown in FIGS. 9 and 10 for example, an elongated hollow shaft 22 is provided with a generally cylindrically shaped wall. The generally cylindrical wall of hollow shaft 22 has an exterior surface 26 and an interior surface 28. As shown in FIGS. 9 and 10 for example, interior surface 28 of hollow shaft 22 runs the entire length of hollow shaft 22, and portions of interior surface 28 define circular cylindrically shaped bearing surfaces 29 that can be used to rotatably support a solid shaft (described hereafter) as well as other members. As shown in FIGS. 9 and 10 for example, hollow shaft 22 defines a longitudinal axis indicated by the designating numeral 24. Longitudinal axis 24 is a central axis of rotation of hollow shaft 22.

As shown for example in FIGS. 9 and 10, a slot is indicated generally by the designating numeral 30 and is defined through exterior surface 26 and interior surface 28. In other words, slot 30 is cut completely through the cylindrical wall of hollow shaft 22. Slot 30 is defined at least in part by a pair of opposed sidewalls 32 (FIGS. 3, 5, 6, 9 and 10 for example) and a pair of opposed endwalls 34 (FIGS. 1, 2, 5, 6, 7, 9 and 10 for example) disposed between sidewalls 32. (When FIG. 1 is used to illustrate the FIG. 2 configuration of the movable cam member and the hollow shaft, then the designating letter A indicates a slot endwall 34.) Each slot sidewall 32 extends in a direction transverse to longitudinal axis 24. The sidewalls may be continuous (FIGS. 1, 3, and 9 for example). The endwalls may be continuous (FIGS. 1 and 8 for example) or discontinuous (FIGS. 5, 9 and 10 for example). A separate slot 30 will be defined in the hollow shaft for each movable cam member (described hereafter) that is desired. Thus, a single hollow shaft 22 might be provided with one or more slots 30 arranged along the length of the hollow shaft.

In further accordance with the present invention, the exterior surface of the hollow shaft defines a base circle band, which is a portion of the exterior surface of the hollow shaft that extends in a circumferential direction between the endwalls of each slot that is defined through the hollow shaft. Preferably, the base circle band extends in the longitudinal direction of the hollow shaft, beyond the portion of the hollow shaft bounded between the sidewalls of the slot. Thus, the width of the base circle band (as measured in the direction of the longitudinal axis of the hollow shaft) is wider than the width of the slot (as measured between the sidewalls of the slot). The portion of the exterior surface of the hollow shaft defined by the base circle band has a constant radius of curvature and is intended to carry the cam follower when the follower is not riding on the cam surface of the movable cam (described hereafter). As shown in FIGS. 1, 2, 3, 4, 5, 5a, 6, 7, 8, 9, 10 and 11, exterior surface 26 of hollow shaft 22 defines a base circle band 36, which extends between endwalls 34 of slot 30. Base circle band 36 defines a portion of exterior surface 26 having a constant radius of curvature extending between the respective endwalls of slot 30. Base circle band 36 is the portion of the exterior surface of hollow shaft 22 that carries a cam follower such as a roller follower when the follower is not riding on the cam surface 54 of the cam lobe member 42 (described hereafter).

In further accordance with some embodiments of the present invention, the hollow shaft further defines base circle arcuate sections that provide upper cam receiving surfaces. The base circle arcuate sections are disposed so as to carry the peripheral edges of a cam follower such as a roller follower. The base circle arcuate sections are disposed beside the sidewalls and near the vicinity of the endwalls of the slot through which the movable cam member (described hereafter) extends. The base circle arcuate sections carry the roller follower over the gap that can be produced between the endwall of the slot and the free edge of the movable cam member that meets the endwall of the slot. At least in the vicinity where the base circle arcuate sections extend to one of the endwalls of the slot, each upper cam receiving surface defines the same radius of curvature as the base circle band. The provision of the base circle arcuate sections is primarily intended for those embodiments of the invention in which the longitudinal length of the roller follower exceeds the width of the cam surface. In such embodiments, the ends of the follower extend beyond the opposite edges of the cam surface.

Figure 2:
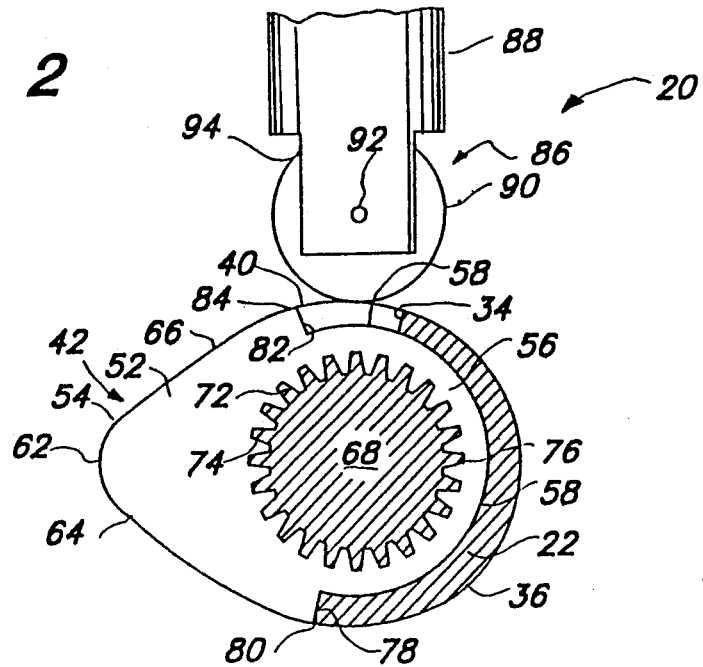
FIG. 2 is a partial cross-sectional view of components of an embodiment of the present invention as taken along the line of sight looking toward 2—2 in FIG. 1.
Figure 3:
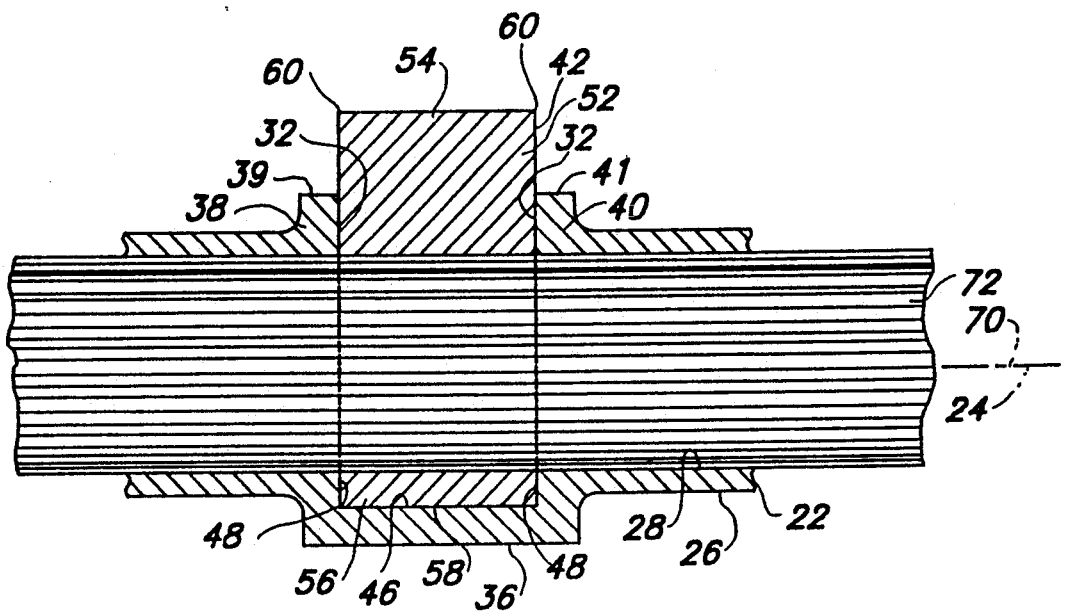

As embodied herein and shown in FIGS. 1 and 2 for example, a pair of base circle arcuate sections 38, 40 are provided on the exterior surface of hollow shaft 22 in the vicinity of one of endwalls 34 of slot 30 where sidewalls 32 of slot 30 meet this endwall 34 of slot 30. Each base circle arcuate section 38, 40 defines an upper cam receiving surface 39, 41, respectively, having the same radius of curvature as base circle band 36. Preferably, as shown in FIG. 1 for example, each upper cam receiving surface 39, 41 extends continuously from one of the peripheral edges of base circle band 36. A similar pair of base circle arcuate sections is provided in the vicinity of the opposite endwall of slot 30, but these base circle arcuate sections are not completely visible in the view shown in the FIGS. 1 and 2. Thus, in the embodiment shown partially in FIG. 1 for example, four base circle arcuate sections are provided.

The base circle arcuate section aspect of the present invention perhaps s more clearly illustrated in FIG. 9 in which four base circle arcuate sections 38, 40, 238, 240, are provided with respective upper cam receiving surfaces 39, 41, 239, 241. In the embodiment shown in FIG. 9 for example, the two base circle arcuate sections 40, 240 disposed to one side of slot 30 are integral with each other, and the other two base circle arcuate sections 38, 238 disposed to the other side of slot 30 are integral with each other. Moreover, as is partially shown in FIGS. 1 and 9 for example, the two base circle arcuate sections disposed to one side of slot 30 are integral with the periphery of the base circle band and together extend around the full 360° of hollow shaft 22 and form a base circle ring with a continuous upper cam receiving surface that carries roller 90 of roller follower 86. Each upper cam receiving surface 39, 41, 239, 241 has a radius of curvature equal to the radius of curvature of base circle band 36 and preferably is integral with base circle band 36, as shown in FIGS. 1 and 9 for example. Each base circle arcuate section has a minimum length that is long enough to extend the full arcuate distance that slot 30 is exposed when the movable cam member 42 (described hereafter) projecting through slot 30 is oriented to expose the maximum gap between the slot endwall 34 and the surface of the movable cam member that abuts with the slot endwall.

In yet further accordance with the present invention, the hollow shaft is provided with a channel defined in the interior cylindrical bearing surface. The channel has channel sidewalls and a channel bearing surface. The channel bearing surface is disposed generally opposite to the slot defined through the hollow shaft. The channel bearing surface is configured to rotatably support the movable cam member inside the hollow shaft. The channel sidewalls are generally disposed transversely to the longitudinal axis of the hollow shaft. As embodied herein and shown in FIGS. 3, 9 and 10 for example, the channel s defined by a channel bearing surface 46 and channel sidewalls 48. The channel has no channel endwalls disposed between channel sidewalls 48. Thus, the channel extends to the endwalls of the slot on the interior cylindrical bearing surface. The provision of the channel is accommodated by the provision of base circle band 36 and provides an additional thickness of material at the location of the hollow shaft where the movable cam member is to be supported by the interior surface of the hollow shaft. As noted above, the base circle band extends in the longitudinal direction of the hollow shaft, beyond the portion of the hollow shaft that is intersected by the sidewalls of the channel.

In addition, all internal corners (where three surfaces meet at an angle) and joints (where two surfaces meet at an angle) are filleted to avoid the stress concentrations associated with sharp corners and joints. As shown in FIG. 3 for example, a surface of constant radius, rather than a sharp, right angled joint, is formed where channel sidewalls 48 meet the periphery of channel bearing surface 46. Importantly, the elimination of sharp, right angle joints helps to reduce structural stresses in hollow shaft 22 where the movable cam member 42 is to be supported.

In further accordance with the present invention, a movable cam member is provided. The movable cam member defines an actuating lobe and a seating member. The actuating lobe and the seating member preferably are integrally connected to each other and typically will be manufactured as a unitary component of the present invention. For example, powder metallurgical casting techniques can be used to manufacture a movable cam member. As embodied herein and shown in FIGS. 1, 2, 3, 4, 5, 5a, 6, 7, 8, and 11 for example, a movable cam member 42 can be disposed so as to project through the slot of the hollow shaft. As shown for example in FIGS. 2, 3, 4, 6, and 7, movable cam member 42 defines a seating member 56 having an outer cylindrical shaft bearing surface 58, which is configured to rotatably engage channel bearing surface 46 of the interior surface of hollow shaft 22.

As embodied herein and shown in FIGS. 2, 3, 4, 6, 8 and 11 for example, movable cam member 42 further defines an actuating member (or lobe) 52, which defines a cam surface 54. Cam surface 54 is configured to project through slot 30 of hollow shaft 22 when outer cylindrical shaft bearing surface 58 is disposed to rotatably engage channel bearing surface 46, which is defined in the interior surface of hollow shaft 22. As shown in FIG. 3 for example, the width of cam surface 54 of movable cam member 42 is bounded by opposed edges 60.

As shown for example in FIGS. 1, 2, 5, 5a, and 7, cam surface 54 is a portion of movable cam member 42 that contacts and carries the cam follower (shown in phantom n FIGS. 1, 5, 5a, and 7). As shown in FIGS. 2 and 4 for example, cam surface 54 is configured to engage the cam follower and defines a profile which includes a nose ramp 62, a leading ramp 64, and a trailing ramp 66. Typically, the profile of the cam surface in the vicinity of the leading ramp and the vicinity of the trailing ramp has a greater radius of curvature than the radius of curvature of the base circle band. Relative to leading ramp 64 and trailing ramp 66, nose ramp 62 is that portion of cam surface 54 that is disposed the greatest distance away from outer shaft bearing surface 58 of seating member 56 of movable cam member 42. In other words, the nose ramp is disposed farther from the exterior surface 26 of hollow shaft 22 when outer cylindrical shaft bearing surface 58 of movable cam member 42 is disposed to rotatably engage channel bearing surface 46 of hollow shaft 22. Nose ramp 62 is similarly disposed the greatest distance away from longitudinal axis 24 than is either the leading ramp 64 or the trailing ramp 66. Leading ramp 64 forms the portion of cam surface 54 that the cam follower engages before the cam follower engages nose ramp 62 as the hollow shaft rotates around its longitudinal axis 24. Similarly, trailing ramp 66 forms that portion of cam surface 54 that the cam follower engages after riding over nose ramp 62 during the revolution of hollow shaft 22.

In further accordance with the present invention, an elongated inner shaft is provided. As embodied herein and shown in FIG. 3 for example, an elongated inner shaft 68 defines an axis of rotation 70 along its length. As shown in FIGS. 1, 2, 5, 5a, 6, and 7 for example, elongated inner shaft 68 preferably s a solid shaft, but can be hollow so long as the hollow form maintains the structural integrity required for operating in the intended environment of the inner shaft.

In yet further accordance with the present invention, means are provided for nonrotatably connecting the inner shaft and the movable cam member for simultaneous rotational movement. In one embodiment of the means for nonrotatably connecting the inner shaft and the movable cam member for simultaneous rotational movement, two mating sets of radially extending spline members are provided. One set of spline members is provided on the outer surface of the inner shaft, and a second set of spline members is provided on the internal circumference of an opening formed transversely through the movable cam member. The two sets of spline members are configured to interlock with one another to prevent relative rotation between the inner shaft and the movable cam member.

As embodied herein and shown in FIGS. 2 and 3 for example, the means for nonrotatably connecting the inner shaft and the movable cam member for simultaneous rotational movement can include a plurality of radially extending spline members 72 defined on the outer surface of inner shaft 68. As embodied herein and shown in FIG. 4 for example, a plurality of radially extending spline members 74 defines a generally centralized opening 76 through movable cam member 42. Each spline member 74 extends in a direction parallel to the direction in which the width of cam surface 54 is measured between edges 60 (FIG. 3 for example). The configuration of the outer surface of inner shaft 68 formed by spline members 72 matches and mates with the configuration of movable cam member opening 76 formed by spline members 74. The radially extending spline members 74 defining opening 76 transversely through the movable cam member 42 are configured to interlock with the radially extending spline members 72 defined on the outer surface of the inner shaft 68. Accordingly, inner shaft 68 can be nonrotatably keyed through opening 76 of movable cam member 42 as shown in FIGS. 1–3 for example.

An example of an alternative preferred embodiment for the means for nonrotatably connecting the inner shaft and the movable cam member for simultaneous rotational movement is a non-circular cross-section inner shaft and a bushing defining a mating non-circular opening. One such embodiment having a hexagonal symmetry for the non-circular mating surfaces is shown for example in FIGS. 3, 4 and 5 of each of U.S. Pat. No. 4,770,060 to Elrod et al. U.S. Pat. No. 4,771,742 to Nelson et al, and U.S. Pat. No. 4,917,058 to Nelson et al, which U.S. Patents again are hereby incorporated herein by reference.

In another alterative embodiment of the means for nonrotatably connecting the inner shaft and the movable cam member for simultaneous rotational movement, a shrink-fitting technique can be used. In such shrink-fitted embodiment, inner shaft 68 can be cylindrical with a circular cross-section, and central opening 76 can be formed with a circular cross-section having a diameter slightly less than the diameter of the cylindrical inner shaft 68. During assembly, inner shaft 68 would be cooled to a temperature sufficient to reduce its diameter, and movable cam member 42 would be heated to a temperature sufficient to increase the diameter of its opening 76. The increased diameter of movable cam member opening 76 accomplished by heating, and the decreased diameter of inner shaft 68 accomplished by cooling, would be sufficient to enable opening 76 of the heated movable cam member 42 to slip over the diameter of inner shaft 68. Upon bringing both inner shaft 68 and cam lobe member 42 to room temperature, the opening of movable cam member 42 would be shrink-fitted and thus nonrotatably secured to the outer surface of inner shaft 68.

In a yet further example of another alternative embodiment for the means for nonrotatably connecting the inner shaft and the movable cam member, as shown for example in FIG. 7, a raised key member extends from movable cam member opening 76 in a direction opposite to nose ramp 62 and toward the center of opening 76, while a key recess such as shown at 79 in FIG. 7 is defined in the outer surface of inner shaft 68 wherever a movable cam member is to be located circumferentially relative to the outer surface of inner shaft 68. Accordingly, in this latter preferred embodiment, each key recess 79 could extend substantially the full length of inner shaft 68 in order to permit inner shaft 68 to pass through central opening 76 of each movable cam member 42 during assembly of the apparatus 20. Thus, if for example four movable cam members are to be mounted at four different circumferential locations, then four key recesses could be formed as continuous grooves in the outer surface of inner shaft 68 at different circumferential locations about the outer surface of inner shaft 68.

One advantage of the FIG. 7 and shrink-fitted embodiments over the embodiments shown in FIGS. 2 and 4 for example is the greater radial thickness of material that exists between the movable cam member opening 76 and outer cylindrical shaft bearing surface 58 that is afforded by the shrink-fit embodiment and the embodiment shown in FIG. 7 versus those embodiments shown in FIGS. 2 and 4 for example. This greater thickness of material forming seating member 56 is likely to be stronger and better able to bear the stresses on the movable cam member during operation of the apparatus 20.

In some alternative embodiments of the present invention, the movable cam member can define a front stop surface and a back stop surface. As embodied herein and shown in FIGS. 2, 6 and 7 for example, movable cam member 42 defines a front stop surface 78 which extends from and forms an edge 80 with the end of leading ramp 64. Edge 80 is the free edge of leading ramp 64 that is disposed opposite from nose ramp 62. Front stop surface 78 is configured and disposed to conform to one of endwalls 34 of slot 30. As embodied herein and shown in FIGS. 2 and 7 for example, movable cam member 42 defines a back stop surface 82 which extends from and forms an edge 84 with the end of trailing ramp 66. Edge 84 is the free edge of trailing ramp 66 that is disposed opposite from nose ramp 62. Back stop surface 82 is likewise configured and disposed to conform to the other of endwalls 34 of slot 30.

FIGS. 2 and 4 illustrate alternative embodiments of movable cam member 42 and hollow shaft 22. The embodiment shown in FIG. 2 already has been described above. Turning now to the two embodiments shown in FIGS. 4 and 10 for example, the exterior surface of hollow shaft 22 defines a pair of grooves. One end of each groove is connected to one of the two opposite ends of slot 30, while the other end of each of the grooves is formed by a groove endwall 98. When FIG. 1 is used to illustrate the FIG. 4 configuration of the movable cam member and the hollow shaft, then the designating letter A indicates a groove endwall 98. Each groove has a bottom surface that defines an exterior cylindrical ear bearing surface 100. The exterior cylindrical ear bearing surface 100 is formed as a section of a cylindrical surface. As shown in FIGS. 4 and 10 for example, one of the exterior cylindrical ear bearing surfaces 100 begins at one end of the slot 30, and the other exterior cylindrical ear bearing surface ends at the opposite end of the slot formed through the wall of the hollow shaft. Similarly, the other end of each exterior cylindrical ear bearing surface begins at one of the groove endwalls 98.

In further accordance with some embodiments of the present invention, the movable cam member can include ear members which extend from the leading ramp and the trailing ramp. These ear members extend the profile of the cam surface without requiring a larger slot and the weakening of the hollow shaft that would accompany a larger slot. The exterior surface of the ear members can provide a transition from the curvature which defines the cam surface to the curvature which defines the base circle band. As embodied herein and shown in FIGS. 4 and 6 for example, movable cam member 42 further defines a front ear 102. Front ear 102 defines an exterior surface that extends from the end of leading ramp 64 disposed opposite from nose ramp 62. The exterior surface of front ear 102 is designated 104. At least the portion of exterior surface 104 of front ear 102 in the vicinity of the free end of the front ear in the FIG. 4 embodiment, is defined by the same radius of curvature that defines base circle band 36 of hollow shaft 22. Front ear 102 further defines an inner cylindrical ear bearing surface 106, which is disposed opposite front ear exterior surface 104. Inner cylindrical ear bearing surface 106 defines the same constant radius of curvature that defines exterior cylindrical ear bearing surface 100 of the grooves in hollow shaft 22. Moreover, inner cylindrical ear bearing surface 106 of front ear 102 and outer cylindrical shaft bearing surface 58 further define the boundary of a front ear cavity 108. Thus as shown for example in FIG. 4, exterior cylindrical ear bearing surface 100 of hollow shaft 22 and interior surface 28 of hollow shaft 22 define opposite surfaces of a portion of hollow shaft 22 that can slide into and out of front ear cavity 108 as movable cam member 42 rotates its outer cylindrical shaft bearing surface 58 relative to channel bearing surface 46 of the interior surface of hollow shaft 22.

In the embodiments including ears on the movable cam member and providing ear cavities therein for the reception of a portion of the hollow shaft defined by exterior cylindrical ear bearing surface 100 and interior surface 28 such as shown in FIG. 4 for example, the strength of the hollow shaft in the vicinity of slot 30 can be increased by virtue of the added portion of the hollow shaft that is receivable in the ear cavities.

In addition, and as shown in FIG. 4 for example, movable cam member 42 further defines a back ear 110. Back ear 110 defines an exterior surface that extends from the end of trailing ramp 66 disposed opposite from nose ramp 62. The exterior surface of back ear 102 is designated 112. At least the portion of exterior surface 112 of back ear 110 in the vicinity of the free end of the back ear, is defined by the same radius of curvature that defines base circle band 36 of hollow shaft 22. Back ear 110 further defines an inner cylindrical ear bearing surface 106, which is disposed opposite back ear exterior surface 112. Inner cylindrical ear bearing surface 106 defines the same constant radius of curvature that defines exterior cylindrical ear bearing surface 100 of the grooves in hollow shaft 22. Moreover, inner cylindrical ear bearing surface 106 of back ear 110 and outer cylindrical shaft bearing surface 58 of movable cam member 42 further define the boundary of a back ear cavity 114. Thus, exterior cylindrical ear bearing surface 100 of hollow shaft 22 and interior surface 28 of hollow shaft 22 define opposite surfaces of a portion of hollow shaft 22 that can slide into and out of back ear cavity 114 as movable cam member 42 rotates its outer cylindrical shaft bearing surface 58 relative to channel bearing surface 46 of the interior surface of hollow shaft 22.

In those preferred embodiments of the present invention in which the length of the roller follower is smaller than or just equal to the width of the cam surface, the provision of base circle arcuate sections is inadequate to carry the roller across the gap formed between the endwall of the slot and the corresponding free edge of the movable cam member. Accordingly, in such embodiments, additional structures provide an uninterrupted transition of the roller from the trailing or leading ramp to the base circle band of the exterior surface of the hollow shaft. Examples of these additional structural provisions are shown in the embodiments illustrated in FIGS. 5, 5a, 6, 9, 10 and 11.

Thus, in two further alternative embodiments shown in FIGS. 5 and 6 for example, each of the leading ramp and trailing ramp of movable cam member 42 can further define a ramp tongue 120. Each ramp tongue 120 defines an exterior roller carrying surface 122. At least the portion in the vicinity of the free end of each exterior roller carrying surface 122 of each ramp tongue 120, defines the same radius of curvature as the radius of curvature of base circle band 36 of hollow shaft 22.

Importantly, each ramp tongue 120 must be long enough in the direction of rotation of hollow shaft 22 so that the ramp tongue can extend beyond and across the maximum exposure of the adjacent slot (in embodiments like those of FIGS. 5, 6 and 10) defined in the hollow shaft when the movable cam member is displaced so as to produce such maximum exposure. This maximum exposure position is shown in each of FIGS. 5 and 6 for example. Such maximum exposure occurs when the outer cylindrical shaft bearing surface .58 of the movable cam member 42 is disposed to engage channel bearing surface 46 of the hollow shaft while the movable cam member is disposed the maximum amount in a direction rotating away from the adjacent slot endwall 34 of the hollow shaft. Moreover, the exterior roller carrying surface 122 of each ramp tongue 120 defines a width measured in the direction of longitudinal axis 24 of hollow shaft 22. This width of each exterior roller carrying surface 122 is narrower than the width of cam surface 54 of movable cam member 42 and narrower than the length of cylindrical surface 96 of roller 90.

Furthermore, in accordance with some embodiments of the present invention, the exterior surface of the hollow shaft further defines a pair of recesses. Each recess is defined through one end of the base circle band. In some embodiments, each recess is defined completely through both the base circle band and the interior surface of hollow shaft, in much the same way that the slot is cut completely through the cylindrical wall of the hollow shaft. In other embodiments, the recess is provided with a bottom surface which desirably is configured with a constant radius of curvature to form a section of a cylindrical surface. In yet other embodiments, each recess is provided with a partial bottom surface and is partially cut completely through the cylindrical wall of the hollow shaft. The provision of either the complete or partial bottom surface adds rigid support to the ramp tongue, and thus allows the thickness of the ramp tongue to be less than it otherwise would need to be.

As embodied herein and shown for example in FIGS. 5, 6, 9, and 10, the exterior surface of hollow shaft 22 further defines a pair of recesses. Each recess is defined through one end of base circle band 36 and is indicated generally in FIGS. 5, 6, 9 and 10 by the designating numeral 118. As shown in FIG. 5 for example, recess 118 is defined completely through base circle band 36 and the interior surface of hollow shaft 22, much as slot 30 is formed. Alternatively, as shown in FIG. 6 for example, recess 118 is provided with a bottom surface 121, which defines an exterior cylindrical tongue bearing surface. Preferably, each exterior cylindrical tongue bearing surface is configured with a constant radius of curvature to form a section of a cylindrical surface. In such embodiments, each of the ramp tongues defines an inner cylindrical tongue bearing surface having the same radius of curvature that defines the exterior cylindrical tongue bearing surface.

Furthermore, as shown in the embodiment illustrated in FIG. 10 for example, recess 118 is provided with a partial bottom surface 121. The provision of bottom surface 121 provides additional rigid support to ramp tongue 120, and thus the thickness of ramp tongue 120 is less in the FIG. 6 embodiment than it is in the FIG. 5 embodiment for example. In addition, in the embodiments shown in FIGS. 5 and 9 for example, each recess 118 communicates with the slot and interrupts one of the slot endwalls 34. Similarly, in the embodiment shown in FIG. 10 for example, each recess 118 can communicate with one of the ends of one of the grooves that is disposed opposite the endwalls of slot 30. It is desirable if each recess is centrally and symmetrically disposed relative to the width of the adjacent slot (as shown in FIG. 5 for example) or adjacent groove (as shown in FIG. 10 for example) and is configured to receive one of ramp tongues 120.

Though not shown in the Figs., the configuration of the ramp tongue that would be used in conjunction with the hollow shaft shown in FIG. 10 would be a combination of the configuration shown for the ramp tongue in FIG. 5 and that shown for the ramp tongue in FIG. 6. The free end of the ramp tongue would be configured like the ramp tongue shown in FIG. 6. The ramp tongue's intermediate portion, which is the portion that joined with the ear portion of the movable cam on the side and with the leading or trailing ramp portion of the movable cam on the end, would be configured as shown in FIG. 5. Thus, the intermediate portion of the ramp tongue would be thicker than the free end of the ramp tongue.

In some embodiments (FIGS. 1 and 2 for example), the free edge of the leading or trailing ramp of the movable cam member can be moved to a position where it abuts against and mates with the nearby endwall 34 of the slot 30. In other embodiments (FIGS. 1, 4 and 10 for example), the free edge of the front or back ear of the movable cam member can be moved to a position where it abuts against and mates with the nearby endwall 98 of the groove. In yet other embodiments (FIGS. 5 and 6 for example), when the free edge of front stop surface 78 (or back stop surface 82, which is not shown in FIGS. 5 and 6) of the leading or trailing ramp of the movable cam member moves to a position where it abuts against and mates with the nearby endwall 34 of the slot, the free edge of the ramp tongue 120 of the movable cam member 42 moves to a position where it abuts against and mates with the nearby endwall 119 of the recess 118. In still further embodiments (FIG. 10 for example), when the free edge of the front or back ear of the movable cam member moves to a position where it abuts against and mates with the nearby endwall 98 of the groove, the free edge of the ramp tongue of the movable cam member moves to a position where it abuts against and mates with the nearby endwall 119 of the recess.

In two further alternative embodiments shown in FIGS. 5a and 11 for example, each leading or trailing ramp 124 defines a free edge 126 which extends at a bias relative to the direction of movement of movable cam member 42 within slot 30. In addition, each endwall of the slot 30 is defined by a biased edge 128 configured to abut uninterruptedly against free edge 126 of one of leading or trailing ramps 124 when the movable cam member is disposed the maximum amount in a direction rotating toward the adjacent endwall of the slot formed in hollow shaft 22. Furthermore, the biasing of free edge 126 and biased edge 128 are configured so that when one of the leading or trailing ramps is disposed so that its free edge 126 abuts against the adjacent biased edge 128 of the endwall of the slot, there is sufficient coverage of the gap produced on the opposite trailing or leading ramp so that sufficient support exists to carry the roller and prevent the roller from falling into any gap formed between the free edge 126 and corresponding adjacent biased edge 128 of the respective trailing or leading ramp. Moreover, the pattern shown in FIG. 11 can be duplicated a number of times instead of just the single instance of the pattern used in the embodiment illustrated in FIG. 11. Accordingly, a saw tooth type configuration is contemplated wherein a number of repetitions of the pattern shown in FIG. 11 are provided for biased edge 128 and free edge 126.

In further accordance with some embodiments of the present invention, the actuating lobe of the movable cam member defines a cylindrical cavity in the free end thereof. A roller member with a circular cylindrical surface is rotatably mounted in the cylindrical cavity. As embodied herein and shown in FIG. 7 for example, the outline of a cylindrical cavity is designated in phantom (dashed line) by the numeral 130. A roller 132 has a cylindrical exterior surface 134 and is rotatably mounted, as by a journal 136 extending in the longitudinal direction of cylindrical cavity 130 and cylindrical roller 132. A cam follower of the lever type is indicated generally by the numeral 86 and includes a rocker arm shown in phantom (dashed line) and indicated by the numeral 138. (Alternatively, a tappet type follower such as shown in FIG. 13 also can be used). Rocker arm 138 is rotatably mounted about a pivot 140. As movable cam member 42 and hollow shaft 22 rotate together in the clockwise direction of arrow 142, the outline of actuating lobe 52 takes up the successive positions indicated in dashed line by the designating numeral 144 and then 146. Roller surface 134 engages the smoothly curving actuating surface 148 of rocker arm 138 as actuating lobe 52 of movable cam member 42 rotates in the direction of arrow 142.

In still further embodiments of the present invention, a second cam member is mounted adjacent a movable cam member. The second cam member desirably is fixed to the exterior surface of the hollow shaft at a position adjacent one of the sidewalls of a slot. The movable cam member is constructed and operates as described above and in Nelson et al U.S. Pat. No. 4,917,058, Nelson et al U.S. Pat. No. 4,771,742, and Elrod et al U.S. Pat. No. 4,770,060, hereby incorporated herein by reference. Typically, the second cam member is not movable relative to the hollow shaft, but may in some embodiments be movable out of phase relative to the crankshaft (designated by the numeral 186 in FIG. 13) such as is explained in the Patents to Nelson et al and Elrod et al already incorporated herein by reference. The second cam member can be considered a twin of the movable cam member insofar as the second cam member defines the indentical cam surface profile as the movable cam member. In other words, the radii of curvature of the leading ramps of the twin cam members are the same, as are the radii of curvature of the trailing ramps and the radii of curvature of the nose portions of the respective movable cam member and its twin second cam member. Moreover, the base circle band defines the same radius of curvature for both of the twin cam members. Furthermore, in some embodiments, the nose portion of the cam surface of the second cam member can be formed by the outer surface of a second circular cylindrical roller member. Moreover, both the movable cam member and the second cam member can be provided with rollers rotatably mounted at their respective nose portions.

As embodied herein and shown in FIG. 8 for example, a movable cam member 42 is configured in the same fashion as previously described with reference to FIG. 7 and is similarly numbered with reference characters. Mounted adjacent movable cam member 42 is a second cam member 150. Second cam member 150 is identically configured as to its profile in all respects as movable cam member 42. Thus, second cam member 150 has a roller surface 152 of a cylindrical roller 154 mounted rotatably on a journal 156. While a lever type follower is not shown in FIG. 8 in order to permit easier viewing of other aspects of this embodiment, a lever type cam follower (similar to that shown in FIG. 7 for example) could be employed.

In the embodiments having rotatable rollers in the nose portion of a single movable cam member or a twin pair of cam members, each movable cam member, either alone or together with a twin second cam member as the case may be, is disposed to actuate a single cam follower. In other words, in some embodiments, such as an engine employing push rods, a single follower is provided to engage the rollers of the nose portions of both cam surfaces of the twin cam members. Each such follower can be formed as the tappet surface of a hydraulic valve lifter. This tappet surface desirably defines a circular cylindrically shaped surface for engaging the cam surfaces of the movable cam member and its twin second cam member. As noted above, in some embodiments the hydraulic valve lifter forms part of a push rod engine. As embodied herein and shown in FIG. 12 for example, a portion of a push rod engine is schematically represented and generally indicated by the designating numeral 174. As shown in FIG. 12 for example, a socket 158 of a hydraulic valve lifter, which is generally designated 160, is shown schematically. A push rod 168 mechanically connects the valve lifter 160 and a rocker arm 138, which in turn acts against one end of a valve stem 169 which passes through a cylinder head 172. A valve head 170 is formed on the opposite end of valve stem 169. A cylinder wall 178 defines a cylinder chamber 180 in which a piston 182 is connected via a connecting rod 184 to a crankshaft 186, which also drives the camshaft actuating member 20 via a timing belt, which is not shown in FIG. 12 but is conventional in the art. A spark plug 188 ignites the fuel-air mixture entering the combustion chamber 190 of cylinder 178. A manifold 192 communicates with combustion chamber 190 via valve opening 194 and may be either an induction manifold or an exhaust manifold depending upon whether valve opening 194 is an intake valve opening or an exhaust valve opening, as known in the art. As embodied herein and shown in FIG. 13 for example, the free end of a valve lifter piston 166 forms a tappet having a circular cylindrically curved tappet surface 196, which engages the cylindrical surface 134, 152 of the cylindrical rollers 132, 154 mounted in the nose portions of second cam member 150 and movable cam member 42.

In further accordance with the present invention, means are provided for holding the tappet surface shared by the twin cam members at a fixed orientation relative to the path of rotation of the twin cam members. As embodied herein and shown for example in FIG. 13, the means for holding the tappet surface at a fixed orientation relative to the path of rotation of the movable cam member and the second cam member includes a key member 162 and a groove 164 for slidably receiving the key member. Groove 164 is configured to restrict movement of key member 162 to one predetermined path, wherein only one of the key member and the groove is connected to the tappet. In the embodiment shown in FIG. 13 for example, groove 164 is connected to the tappet by being defined in piston

166. Desirably, the one predetermined path of movement of the key member defines a straight line. The restriction of key 162 to move only within groove 164 prevents the piston 166 of the lifter 160 from rotating relative to its socket 158. In this way, the central longitudinal axis of rotation of the cylindrical surface remains fixed in a transverse direction relative to the direction of rotational movement of the cam members as the camshaft rotates. In other words, the central longitudinal axis of curvature of the tappet surface is maintained coincident with the central longitudinal axis of rotation of each of the cam members. Since the tappet surface cannot rotate, it engages each roller in a fashion similar to the way roller surface 134 engages smoothly curving rocker arm actuating surface 148 as shown in the view of FIG. 7 for example.

In embodiments such as shown in FIGS. 1, 2, 3, 4 and 9, the base circle arcuate sections such as base circle arcuate sections 38, 40, 238, 240 are provided with upper cam receiving surfaces 39, 41, 239, 241, respectively, on which the peripheral edges of cylindrical rollers 90 will be carried in the vicinity where a gap is formed as the endwall 34 of slot 30 is separated from the leading or trailing edge of the movable cam member 42. In such embodiments, the length of the roller 90 in the longitudinal direction of roller 90 must be longer than the width of cam surface 54 defined between edges 60 of movable cam member 42 so that in operation, roller 90 extends beyond edges 60 and can be received and carried by upper cam receiving surfaces 39, 41, 239, 241 of oppositely disposed base circle arcuate sections 38, 40, 238, 240, respectively.

In alternative embodiments such as shown in FIGS. 5, 5a, 6, 10, and 11, the roller 90 need not extend beyond edges 60 of cam surface 54 and base circle arcuate sections 38, 40, 238, 240 likewise need not be provided. However, in order to carry roller 90 across the gap formed between endwalls 34 of slot 30 and the edges 35 of the leading or trailing ramps and/or the peripheral edges of the respective front and back ears, and thus avoid the introduction of discontinuous movements in opening and closing the valves, a ramp tongue 120 is provided with a roller carrying surface 122 which has the same radius of curvature as base circle band 36 of hollow shaft 22. The length of roller carrying surface 122 measured in the direction of rotation of cam member 42 about longitudinal axis 24 of hollow shaft 22 must be long enough to bridge the gap formed between endwalls 34 of slot 30 and the peripheral edges of the movable cam member opposed to the endwalls of the slot.

As shown in FIG. 9 for example, a hollow shaft 22 can be provided with base circle arcuate sections 38, 40, 238, 240 and recess 118 so that such hollow shaft could be used with an embodiment employing a roller that was longer than the width of a cam member or shorter than the width of the cam member. Removal of base circle arcuate sections 38, 40, 238, 240 from the embodiment shown in FIG. 9 would yield an embodiment such as shown in FIG. 5 for example.

What is claimed is:

1. An actuating apparatus employing one or more cams, comprising:
   (a) an elongated hollow shaft, said shaft defining a longitudinal axis, an exterior surface, an interior surface, and a slot defined through said interior and exterior surfaces,
   i) said interior surface of said hollow shaft defining an interior cylindrical bearing surface,
   ii) said slot being defined by a pair of opposed sidewalls and a pair of opposed endwalls disposed between said sidewalls, each said slot sidewall extending in a direction transverse to said longitudinal axis,
   iii) said exterior surface of said hollow shaft further defining a base circle band having a constant radius of curvature and extending circumferentially between said endwalls of said slot,
   (b) a movable cam member, said movable cam member defining an actuating lobe and a seating member integrally connected to said actuating lobe,
   i) said actuating lobe defining a cam surface,
   ii) said seating member defining an outer cylindrical shaft bearing surface disposed opposite said cam surface,
   iii) said outer cylindrical shaft bearing surface being configured to rotatably engage said interior cylindrical bearing surface of said hollow shaft,
   iv) each of said actuating member and sad cam surface having a width configured to project through said slot of said hollow shaft when said outer cylindrical shaft bearing surface is disposed to rotatably engage said interior cylindrical bearing surface of sad hollow shaft, said width of said cam surface being defined by opposed edges,
   v) said cam surface being configured to engage the cam follower and defining a nose portion, a leading ramp, and a trailing ramp,
   vi) said nose portion being disposed between said leading ramp and said trailing ramp, relative to said leading ramp and said trailing ramp said nose portion being the portion of said cam surface disposed the greatest distance away from said outer cylindrical shaft bearing surface,
   vii) said leading ramp forming the portion of said cam surface that the cam follower engages before engaging said nose portion during revolution of said hollow shaft about said longitudinal axis of said hollow shaft,
   viii) said trailing ramp forming the portion of said cam surface that said follower engages after passing said nose portion during revolution of said hollow shaft,
   ix) said nose portion of said cam surface being formed by the outer surface of a circular cylindrical roller member,
   x) said roller member being rotatably mounted in said actuating lobe between said leading ramp and said trailing ramp;
   (d) an elongated inner shaft defining an axis of rotation along the length thereof and having an outer surface; and
   (e) means for nonrotatably connecting sad inner shaft and said movable cam member for simultaneous rotational movement.

2. An apparatus as in claim 1, wherein:
   i) said exterior surface of said hollow shaft defining a pair of recesses, each sad recess extending in a direction transverse to said longitudinal axis of said hollow shaft, one end of one of said recesses communicating with one end of said slot, one end of the other of said recesses communicating with the opposite end of said slot,
   ii) one of said recesses being defined through one end of said base circle band and the other of said recesses being defined through the opposite end of said base circle band;

iii) said movable cam further defining a pair ramp tongues, each of said ramp tongues defining an exterior roller carrying surface, each of said exterior roller carrying surfaces being defined near its free end by the same radius of curvature that defines said base circle band of said hollow shaft, each said exterior roller carrying surface of each said ramp tongue defining a width measured in the direction of said longitudinal axis of rotation of said movable cam member, each said width of each said exterior roller carrying surface being narrower than said width of said cam surface, iv) one of said ramp tongues extending from the end of said leading ramp disposed opposite from said nose portion, and the other of said ramp tongues extending from the end of said trailing disposed opposite from said nose portion, ramp v) each said ramp tongue being long enough to extend beyond and across the maximum exposure of said adjacent portion of said slot in said hollow shaft when said outer cylindrical shaft bearing surface of said movable cam member is disposed to engage said interior cylindrical bearing surface of said hollow shaft and said movable cam member is displaced the maximum amount in a direction rotating away from said adjacent endwall of said slot, vi) each said recess of said exterior surface of said hollow shaft being configured just wide enough to receive one of said ramp tongues, and vii) each said ramp tongue being configured and disposed to be received into one of said recesses when said outer cylindrical shaft bearing surface of said movable cam member is disposed to engage said interior cylindrical bearing surface of said hollow shaft.

3. An apparatus as in claim 1, further comprising:
(e) a cam follower, said cam follower including:
   i) a tappet defining a circular cylindrically shaped surface for engaging said cam surface of said movable cam member, and
   ii) means for holding said tappet surface at a fixed orientation relative to the path of rotation of said movable cam member.

4. An apparatus as in claim 3, wherein: said means for holding said tappet surface at a fixed orientation relative to the path of rotation of said movable cam member includes a key member and a groove for slidably receiving said key member, said groove being configured to restrict movement of said key member to one predetermined path, wherein only one of said key member and sad groove are connected to said tappet.

5. An apparatus as in claim 1, further comprising:
(e) a second cam member disposed adjacent said movable cam member, said second cam member having an identical cam surface profile to said movable cam member.

6. An apparatus as in claim 5, wherein: said second cam member is fixed to said exterior surface of said hollow shaft adjacent one of said sidewalls of said slot.

7. An apparatus as in claim 6, wherein: said nose portion of said cam surface of said second cam member being formed by the outer surface of a second circular cylindrical roller member.

8. An apparatus as in claim 5, further comprising:
(f) a cam follower, said cam follower including:
   i) a tappet defining a circular cylindrically shaped surface for engaging said cam surfaces of said movable cam member and said second cam member, and
   ii) means for holding said tappet surface at a fixed orientation relative to the path of rotation of said movable cam member and said second cam member.

9. An apparatus as in claim 8, wherein: said means for holding said tappet surface at a fixed orientation relative to the path of rotation of said movable cam member and said second cam member includes a key member and a groove for slidably receiving said key member, said groove being configured to restrict movement of said key member to one predetermined path, wherein only one of said key member and said groove are connected to said tappet.

10. An apparatus as in claim 9, wherein: said one predetermined path of movement of said key member defines a straight line.

* * * * *